(12) United States Patent
Winters et al.

(10) Patent No.: US 7,262,238 B2
(45) Date of Patent: Aug. 28, 2007

(54) RESIN COMPOSITION

(75) Inventors: Robin Winters, Sittard (NL); Ivo Maria Johannes Erens, Wijnandsrade (NL); Patrick Peter Mario Aarts, Elsloo (NL); John Hazen, Spaubeek (NL)

(73) Assignee: Hexion Specialty Chemicals, Inc., Columbus, OH (US)

( * ) Notice: Subject to any disclaimer, the term of this patent is extended or adjusted under 35 U.S.C. 154(b) by 276 days.

(21) Appl. No.: 10/760,326

(22) Filed: Jan. 20, 2004

(65) Prior Publication Data

US 2004/0171727 A1    Sep. 2, 2004

Related U.S. Application Data

(60) Provisional application No. 60/441,494, filed on Jan. 21, 2003.

(30) Foreign Application Priority Data

Jan. 20, 2003    (EP) .................................. 03445008

(51) Int. Cl.
   *C08K 5/10*        (2006.01)
(52) U.S. Cl. ...................... 524/315; 524/316; 524/317; 524/318; 525/54.42; 526/238.3; 526/283

(58) Field of Classification Search ........ 524/315–318; 525/54.42; 526/238.3, 283
See application file for complete search history.

(56) References Cited

U.S. PATENT DOCUMENTS

| | | | |
|---|---|---|---|
| 4,433,100 A * | 2/1984 | Laurito | 525/54.42 |
| 5,691,432 A | 11/1997 | Williams | 526/283 |
| 5,693,731 A | 12/1997 | Williams et al. | 526/224 |
| 2001/0008921 A1 | 7/2001 | Matzinger | 525/290 |
| 2001/0049420 A1 | 12/2001 | Matzinger | 525/329.7 |

FOREIGN PATENT DOCUMENTS

| | | |
|---|---|---|
| EP | 0 300 624 A2 | 1/1989 |
| EP | 0 300 624 A3 | 1/1989 |
| EP | 0 708 121 A2 | 4/1996 |
| EP | 1 054 028 A1 | 11/2000 |

* cited by examiner

*Primary Examiner*—Peter Szekely

(57) ABSTRACT

The present invention refers to a resin composition comprising an ester compound and a polymer, wherein the ester compound and the polymer are obtainable by reacting a diene, a dienophile and a carboxylic acid. The invention also refers to adhesive compositions comprising the resin composition.

17 Claims, No Drawings

RESIN COMPOSITION

The present application claims priority of Europe Application No. 03445008.0, filed on Jan. 20, 2003 and U.S. Provisional Patent Application No. 60/441,494, filed on Jan. 21, 2003.

The present invention relates to a resin composition suitable for adhesive applications comprising an ester compound and a polymer, whereby the ester compound and the polymer is obtainable by reacting a diene, a dienophile and a carboxylic acid.

BACKGROUND OF THE INVENTION

Synthetic polymers such as acrylic polymers have, for the most part, replaced naturally occurring materials such as animal glues, starches and vegetable gums in many adhesive applications. The key to this replacement was the development and use of tackifier resins in the formulation with synthetic polymers, because they give the system the ability to wet the substrate surface and thus form a strong bond. Without tackifiers in the adhesive formulation, the synthetic polymers have low tack and peel adhesive performance.

Various resinous materials have been suggested as tackifiers for synthetic polymers. Examples of materials suggested include rosin, disproportionated rosin, rosin esters such as glycerol esters of rosin and pentaerythritol esters of rosin, aliphatic hydrocarbon resins from petroleum, aromatic petroleum resins, DCPD (dicyclopentadiene) resins, terpene resins, terpene/phenol resins and cumarone/indene resins.

Tackifiers are resins that can be considered as high viscosity solvents for the base polymer. The term tackifier therefore, cannot be given to any material unless we relate that material to the product that it tackifies.

Acrylic polymer compositions have long been used as adhesive compositions, particularly in PSA (pressure sensitive adhesive) compositions. Common PSA compositions include a high-molecular-weight acrylic base polymer and a tackifying resin and when required, plasticizer, stabiliser, antioxidant, filler, colouring agent and the like. PSA compositions should have a high initial tack so that the adhesive surface merely needs to be contacted and pressed to the surface to achieve bonding. There should be little or no requirement to hold the adhesive and substrate in position for any significant time while a bond develops.

In developing adhesive formulations one seeks the optimum combination of several adhesive properties and since it is not generally possible to achieve the optimum for every property it is necessary to obtain the best balance of properties for the particular use in mind. In e.g. PSA compositions that are used in the label industry one tries to optimise the loop tack and peel and at the same time provide an adhesive whose component will not migrate during storage.

Nowadays mainly rosin derivatives, such as disproportionated rosin acids, and hydrocarbon resins are commercially used as tackifiers for adhesive compositions comprising acrylic polymers. The rosin derivatives have been preferred due to better compatibility with acrylics.

Initially most important were the solvent acrylics, but environmental, health and safety needs of industry have resulted in dramatic growth in water borne adhesive compositions comprising acrylic polymers. With increasing desirability of water borne systems and often their demonstration of significant performance enhancements with tackifier resins, new tackifier resins suitable for these systems are being sought.

EP 300624 discloses acid functional polymer resins which are obtained by polymerising an olefin or mixture of olefin, reacting the formed polymer with an acid to form an acid functional polymer which polymer subsequently is neutralised with a base.

The present resin composition combines the good adhesive properties of rosin among other no bleed trough, with the short reaction times generally applied for the synthesis of hydrocarbon resins. Another advantage with the present resin composition is that it provides improved adhesion properties of PSA compositions on non-polar surfaces. In addition, this resin composition has an improved smell and colour over the traditional hydrocarbon resins made by thermal polymerisation, without the need of a hydrogenation step. A further advantage with the present invention is to provide a resin composition comprising a minimum amount of rosin derived from natural sources thereby reducing the cost of production.

THE INVENTION

The present invention refers to a resin composition, adhesive compositions comprising the resin composition, such as aqueous-, hot melt-, and flooring- PSA-compositions, method for producing the resin composition and use of the resin composition. More specifically, the present invention relates to a resin composition comprising at least 5% by weight of an ester compound, and a polymer, wherein the ester compound and the polymer are obtainable by reacting a diene, a dienophile and a carboxylic acid. The resin composition can also be used as an intermediate for the production and use of ink resins.

The present resin composition, which suitably functions as a tackifier in adhesive compositions, comprises an ester compound and a polymer, both simultaneously obtainable by reacting a diene, a dienophile and a carboxylic acid. The polymer, which is preferably a polymer having no acid functionalities, normally has a weight average molecular weight which is considerably higher than the molecular weight of the ester compound. Commonly, the weight average molecular weight of the polymer is in the range of from about 200 up to about 5000, suitably from about 300 up to about 3000. The ester compound, which can be referred to as a non-polymeric compound, suitably has a molecular weight of from about 250 up to about 1000, preferably from about 300 up to about 500.

The weight ratio of ester compound to polymer in the resin composition is generally from about 1:0.5 to about 1:2, suitably from about 1:0.8 to about 1:1.2.

The resin composition comprises at least 5% by weight of the ester compound, preferably at least 10 weight %, most preferably at least 25 weight %. The resin composition comprises suitably from about 5 to about 70% by weight of the ester compound, preferably from about 10 to about 60% by weight, even more preferably from about 25 to about 55% by weight, and most preferably from about 35 to about 50% by weight.

The diene is preferably selected from hydrocarbon dienes such as cyclic hydrocarbons, i.e. mono-cyclic or polycyclic, and non-cyclic hydrocarbon dienes, the latter being both straight chain and branched dienes. Preferably, the dienes are cyclic dienes commonly having at least 5 carbon atoms. The dienes may also be substituted with lower alkyls such as methyl, ethyl and the like. Examples of polycyclic hydrocarbon dienes are dicyclopentadiene and norbornene. Examples of monocyclic hydrocarbon dienes are cyclopentadiene, alkyl substituted cyclopentadiene such as methyl cyclopentadiene, ethyl cyclopentadiene, etc. Non-cyclic hydrocarbon dienes can be straight and branched hydrocarbons typically having at least 4 carbon atoms, such as $C_5$ dienes like isoprene, piperylene, but also butadiene. Mixtures of the above mentioned dienes can also be used.

Suitable dienophiles are basically all compounds which can undergo a Diels-Alder reaction with the diene. Preferred dienophiles include cyclic hydrocarbons such as all monocyclic and poly-cyclic dienes mentioned above, i.e. monocyclic and polycyclic hydrocarbons having at least 5 carbon atoms, as well as terpenes, like mono-terpenes ($C_{10}$) such as b-myrcene, b-ocimene, etc, sesquinterpenes ($C_{15}$), diterpenes ($C_{20}$), terpinenes and limonenes; aromatic vinylic hydrocarbons, typically monocyclic aromatic vinylic hydrocarbons which may be substituted, such as styrene and alkyl styrene, e.g. methyl styrene; $C_9$ feedstream compounds exemplified by vinyl toluene and indenes. Furthermore, dienophiles can also be organic diacids or anhydrides such as maleic acid, acrylic acid, fumaric acid and maleic anhydride; benzoquinone, vinyl kentones, such as methyl vinyl kentone, acrolein, acrylate esters, such as methyl acrylate, acrylonitrile, nitroalkenes, esters of acetylenedicarboxylic acid, like dimethyl ester of acetylenedicarboxylic acid, dibenzoacetylene, dicyano acetylene, esters of azodicarboxylic acid, such as dimethyl ester of azodicarboxylic acid, iminourethanes, methyl vinyl sulfone, tetracyanoethylene, diethyl vinylphosphonate.

The carboxylic acid used for producing the resin composition is suitably a carboxylic acid including one or more carboxylic acid functions. Suitable carboxylic acids include carboxylic acids having up to about 1000 carbon atoms, preferably up to about 100 carbon atoms. Examples of suitable carboxylic acids are fatty acids having from about 8 up to about 25 carbon atoms such as oleic acid, stearic acid, palmitic acid, linoleic acid and the like; organic diacids or anhydrides, e.g. terephthalic acid, isophthalic acid, phthalic acid, malonic acid, dimethyl malonic acid, succinic acid, glutaric acid, adipic acid, trimethyl adipic acid, pimelic acid, 2,2-dimethyl glutaric acid, azelaic acid, sebacic acid, fumaric acid, maleic acid, itaconic acid, pimelic acid, 1,3-cyclopentanedicarboxylic acid, 1,2 cyclohexanedicarboxylic acid, 1,4-cyclohexanedicarboxylic acid, 2,5-norbornanedicarboxylic acid, 1,4-naphthalic acid, diphenic acid, 4,4'-oxydibenzoicacid, diglycolic acid, 2,5-naphtalenedicarboxylic acid; and rosin acids or derivatives of rosin acids. The preferred carboxylic acid is rosin acid or derivatives of rosin acid. Rosin acids are suitably derived from natural sources such as gum rosin, wood rosin and tall oil rosins. Rosin acids are commonly mixtures of a wide variety of different isomers of monocarboxylic tricyclic rosin acids usually containing around 20 carbon atoms. The tricyclic rosin acids differ mainly in the position of the double bonds. Typically the rosin is a mixture of substances comprising levopimaric acid, neoabietic acid, palustric acid, abietic acid, dehydroabietic acid, seco-dehydroabietic acid, tetrahydroabietic acid, dihydroabietic acid, pimaric acid, and isopimaric acid. The rosin acids derived from natural sources also include rosins, i.e. rosin mixtures, modified notably by polymerisation, isomerisation, disproportionation and hydrogenation.

According to a further preferred embodiment of the present invention, the resin composition comprises an ester compound and a polymer having no acid functionalities, whereby the ester compound is obtainable by reacting a diene, a non-acid dienophile, and a carboxylic acid. By non-acid dienophile is meant a dienophile which will give a polymer having no acid functionalities such as carboxylic acid (residue) functionalities when reacting will an appropriate diene.

The resin composition is suitably obtainable by reacting a diene, a dienophile and a carboxylic acid present in a reaction mixture. The reaction mixture suitably comprises up to about 75% by weight, also suitable from about 0 to about 75% by weight of a diene, up to about 55% by weight, also suitable from about 0 to about 55% by weight, of a dienophile, and from about 10 to about 75% by weight of a carboxylic acid. Preferably, the reaction mixture comprises from about 15 to about 60% by weight, more preferably from 20 to 55% by weight, of a diene, from 10 to 45% by weight, more preferably from 15 to 40% by weight, of a dienophile, and from 15 to 60% by weight, more preferably from 20 to 55% by weight, of a carboxylic acid.

The resin composition of the present invention is usually formed by adding the diene, the dienophile, the carboxylic acid and, if rosin acid is used as the carboxylic acid, suitably a disproportionation agent in any order or premix to a reactor. In case the reactants are solid at ambient temperature they preferably should be heated so that the reactants are substantially in liquid form prior to addition. Apart from the above mentioned reactants and disproportionating agent, other additives such as esterification and bleaching catalysts can be present, e.g. phosphoric acids, phosphorous acids, hypophosphorous acids, para-toluene sulphonic acid, phitic acid, lithium carbonate, calcium hydroxide, calcium acetate, zinc oxide, phosphates, acid clay and montmorillonites and mixtures thereof. Suitable disproportionation agents are palladium, nickel, platinum, iodine, iodides, sulphur, sulfides and mono and polysulfides. The presence of disproportionation agents is specifically preferred when rosin acids are used. The temperature during the reaction is typically from about 175 up to about 310, suitably from about 200 to about 275. The duration of the reaction will depend on the reaction temperature, and will furthermore also influence the acid number of the resin composition. Thus, the acid number will normally decrease with increased reaction time. The reaction time is suitably adjusted so that the resin composition has an acid number below about 50, more preferably below 30 and most preferably below 20. Commonly, a temperature from about 260 up to about 275 is maintained from about 1 to about 2 hours. The pressure during the reaction is preferably higher than atmospheric suitably from about 1.5 up to about 12 bar, more preferably from about 3 to about 8 bar. After reaction, the mixture is normally cooled down to a temperature of about 225° C. or lower while the residual pressure is decreased to approx. 2 bar. Subsequently, the mixture is suitably stripped with an inert gas such as $N_2$ and water up to about four hours in total.

The resin composition according to the present invention suitably has an acid number below about 50, more preferably below about 30 and most preferably below about 20.

The physical state of the resin composition can be solid or liquid at ambient temperature depending largely on the type of reactants used. The hydrocarbon ester resin composition may suitably be blended with other resins such as hydrocarbon resins and rosin acids like methyidehydroabietic acid and rosin esters like pentaerythritol esters of rosin.

The resin composition, commonly referred to as a tackifier when used in adhesive compositions, according to the present invention is preferably comprised in adhesive compositions, specifically PSA compositions such as aqueous, hot melt, and flooring PSA compositions.

Apart from the resin per se the PSA compositions comprise polymers. Suitable polymers are exemplified by natural and synthetic rubbers such as polychloroprene rubber, styrene-butadiene rubbers, SIS (styrene-isoprene-styrene) block copolymers, SBS (styrene-butadiene-styrene) block copolymers, EVA (vinylacetate ethylene copolymers), nitrile rubbers and polyisobutylene rubbers, acrylate polymers, acrylic polymers such as acrylic esters and methacrylate polymers or mixtures thereof.

Suitable polymers used in aqueous adhesive compositions according to the invention are acrylic polymers and/or acrylic ester copolymers dispersed in an aqueous phase which can be obtained by emulsion polymerisation of a wide range of olefins and acrylates such as 2-ethylhexyl acrylate and butyl acrylate. The polymer is suitably present in the form of an aqueous polymer dispersion in an amount from 50 up to 70 weight % based on total polymer dispersion, preferably from 55 up to 65 weight %.

The aqueous adhesive composition usually comprises the resin composition in an amount from 10 up to 40 weight % based on total aqueous composition, preferably from 20 up to 30 weight %, and the polymer dispersion in an amount from 50 up to 90 weight % based on total aqueous composition, preferably from 70 up to 80 weight %. When the resin composition is used in aqueous composition, the resin composition is preferably supplied in form of an aqueous dispersion. The amount of dispersing agent is usually from 2 to 8% by weight based on resin composition.

Other compounds known to the person skilled in the art may also be comprised in the water borne adhesive composition exemplified by wetting agents, defoamers, rheological agents, biocide, thickeners, plasticisers, stabilisers, antioxidants, fillers, colouring agent and the like.

According to a further preferred embodiment, the resin composition is comprised in a hot melt PSA composition. The hot melt compositions preferably contain polymer resins including ethylene copolymers of ethylene and other various monomers such as vinyl acetate, methyl acrylate, ethyl acrylate and other acrylates. In addition, styrene block copolymers (SBC), such as SBS, SIS and styrene-ethylene-butylene-styrene (SEBS) are employed in the present invention. EVA and SBS based copolymers are particularly preferred.

In addition, ethylene copolymer-based hot melt compositions may comprise mineral waxes such as paraffin wax and microcrystalline wax and synthetic waxes such as polyethylene wax and polypropylene wax. Other animal or vegetable waxes may also be used.

Preferred examples of oil used in the SBC-based hot melt compositions of the present invention include naphthenic or paraffinic mineral oils of relatively high molecular weight and olefin oligomers. Other vegetable and/or animal oils may be used.

The resin composition is preferably present in the hot melt composition in amounts from 10 up to 60% by weight based on total composition more preferably from 30 up to 60% by weight.

The styrene block copolymers are suitably present in the hot melt composition from 10 up to 75% by weight more preferably from 10 up to 40% by weight.

The wax may be added from 5 up to 50% by weight, suitably from 5 up to 30% by weight.

According to yet another embodiment of the present invention the resin composition is comprised in a flooring adhesive composition. Suitable polymers used in flooring adhesive compositions are exemplified by natural and synthetic rubbers such as polychloroprene rubber, styrene-butadiene rubbers, EVA (vinylacetate ethylene copolymers), nitrile rubbers and polyisobutylene rubbers, acrylate polymers, acrylic polymers such as acrylic esters and methacrylate polymers or mixtures thereof. The polymer is suitably present in the form of a polymer solution or an aqueous polymer dispersion in an amount from 50 up to 70 weight % based on total polymer dispersion or solution, preferably from 55 up to 65 weight %. In addition, to the polymer and the resin composition fillers are added such as calcium carbonate.

The flooring adhesive composition usually comprises the resin composition in an amount from 10 up to 45 weight % based on total composition, preferably from 20 up to 30 weight %, the polymer dispersion in an amount from 10 up to 45 weight % based on total composition, preferably from 20 up to 30 weight %, and the filler in an amount from 30 up to 70 weight % based on total composition, preferably from 40 up to 60 weight %.

The amount of polymers/copolymers and other compounds contained in the adhesive compositions, i.e. aqueous, solvent compositions or hot melt compositions, is/are not critical and may vary so as to give the preferred properties of the adhesive composition. The compounds can be in any physical state guided by the state of the adhesive composition such as dissolved in a suitable solvent, dispersed in an aqueous phase, liquid or solid.

The invention is further illustrated by the following examples, which, however, are not intended to limit the same.

EXAMPLES

Example 1

The tackifier resin composition according to the present invention (resin 1) was prepared by adding 263 g of a Chinese gum rosin, 297 g of dicyclopentadiene (DOW resin grade), 240 g of styrene and 1,5 g of a disproportionation agent (Lowinox TBM-6, Great Lakes Chemical Ltd.) to a reactor. The reaction mixture was subsequently heated to 275° C. at a pressure of approx. 8 bar. After about 1,5 hours reaction time the acid number of the obtained resin composition was 13 and the mixture was allowed to cool down to 225° C. while releasing the residual pressure of around 2 bar. The reaction mixture was subsequently stripped with $N_2$ and water. Of this resin composition 300 g was dispersed with the aid of 20 g ethoxylated phosphate ester surfactant.

A further prior art tackifier resin (resin 2) according to EP 300624, example 3, was prepared by reacting 640 g Chinese gum rosin, 80 g dicyclopentadiene (DOW high purity grade), 80 g of C9-feedstream aromatic hydrocarbons (DOW Resin feed prime). The obtained resin was emulsified according to procedure mentioned in EP 300624.

Aqueous PSA compositions comprising the above tackifier resin composition were formulated by blending the above resin composition with an aqueous acrylic polymer dispersion, BASF Acronal V215. The compositions contained 30% by weight of the respective tackifier resin composition and 70% by weight of acrylic polymer dispersion. The performance of the resins was evaluated by comparing tack and peel.

TABLE 1

| Tackifier resin | Tack | | | |
|---|---|---|---|---|
| | Card | HDPE | Stainless steel | Glass |
| 1 (the invention) | 5.3 | 11.4 | 20.1 | 21.8 |
| 2 (prior art) | 4.4 | 10.5 | 16.1 | 18.7 |

TABLE 2

| Tackifier | Peel | | | |
|---|---|---|---|---|
| | Card | HDPE | Stainless steel | Glass |
| 1 (the invention) | 4.9 | 6.2 | 12.5 | 12.9 |
| 2 (prior art) | 4.4 | 5.1 | 10.7 | 10.5 |

As shown by table 1 and 2, both peel and tack are significantly improved for the aqueous PSA composition comprising the tackifier resin composition according to the invention.

Example 2

The same PSA compositions as described in example 1 were evaluated using the shear SS steel test according to FINAT test method FTM8. The PSA composition comprising the resin according to EP 300624 received a value of 41 hours while the PSA composition comprising the resin composition according to the invention obtained a value of 86 hours. Thus, the PSA composition according to the invention was significantly better with regard to the shear Stainless steel test.

The invention claimed is:

1. A resin composition comprising a polymer and at least 5% by weight of an ester compound, wherein the ester compound and the polymer are obtained by reacting a diene, a dienophile and a rosin acid in the presence of a disproportionation agent, wherein the dienophile is an aromatic vinylic hydrocarbon.

2. A resin composition according to claim 1 comprising at least 10% by weight of the ester compound.

3. A resin composition according to claim 1, wherein the polymer has no acid functionalities.

4. A resin composition according to claim 1, wherein the ester compound and the polymer are obtained from a reaction mixture, comprising up to 75% by weight of the diene, up to 55% by weight of the dienophile, and from about 10 to about 75% by weight of the rosin acid.

5. A resin composition according to claim 4, wherein the reaction mixture comprises from about 15 to about 60% by weight of the diene, from about 10 to about 45% by weight of the dienophile, and from about 15 to about 60% by weight of the carboxylic acid.

6. A resin composition according to claim 1, wherein the resin composition has an acid number below 50.

7. A resin composition according to claim 1, wherein the resin composition has an acid number below 20.

8. A resin composition according to claim 1, wherein the diene is a hydrocarbon diene.

9. A resin composition according to claim 8, wherein the diene is a cyclic hydrocarbon diene.

10. A resin composition according to claim 9, wherein the diene is a polycyclic hydrocarbon diene.

11. A resin composition according to claim 10, wherein the diene is dicyclopentadiene.

12. A resin composition according to claim 1, wherein the dienophile is styrene.

13. A resin composition comprising a polymer and at least 5% by weight of an ester compound, wherein the ester compound and the polymer are obtained by reacting a polycyclic hydrocarbon diene, a dienophile and a rosin acid or a mixture of rosin acids in the presence of a disproportionation agent, wherein the dienophile is an aromatic vinylic hydrocarbon, and wherein the resin composition has an acid number below 50.

14. A resin composition according to claim 13, wherein the ester compound and the polymer are obtained by reacting up to 75% by weight of the diene, up to 55% by weight of the dienophile, and from 10 up to 75% by weight of the rosin acid or the mixture thereof.

15. A resin composition comprising at least 5% by weight of an ester compound, and a polymer, wherein the ester compound and the polymer are obtained by reacting a polycyclic hydrocarbon diene, styrene and a rosin acid or a mixture of rosin acids in the presence of a disproportionation agent.

16. A method for producing a resin composition which comprises providing a reaction mixture comprising up to 75% by weight of a diene, up to 55% by weight of a dienophile, wherein the dienophile is an aromatic vinylic hydrocarbon, and from about 10 to about 75% by weight of a rosin acid in the presence of a disproportionation agent, heating the reaction mixture at a temperature from about 175° C. up to 310° C. for about 1 up to 2 hours.

17. A method for producing a resin composition according to claim 16, wherein the reaction mixture comprises from about 15 to about 60% by weight of a diene, from about 10 to about 45% by weight of a dienophile, and from about 15 to about 60% by weight of a rosin acid.

* * * * *